(12) United States Patent
Oku et al.

(10) Patent No.: US 8,511,173 B2
(45) Date of Patent: Aug. 20, 2013

(54) DISPLACEMENT TRANSDUCER

(75) Inventors: Hiromasa Oku, Tokyo (JP); Masatoshi Ishikawa, Tokyo (JP)

(73) Assignee: The University of Tokyo, Tokyo (JP)

( * ) Notice: Subject to any disclaimer, the term of this patent is extended or adjusted under 35 U.S.C. 154(b) by 251 days.

(21) Appl. No.: 12/990,188

(22) PCT Filed: Mar. 30, 2009

(86) PCT No.: PCT/JP2009/056464
§ 371 (c)(1),
(2), (4) Date: Jan. 13, 2011

(87) PCT Pub. No.: WO2009/133743
PCT Pub. Date: Nov. 5, 2009

(65) Prior Publication Data
US 2011/0123369 A1   May 26, 2011

(30) Foreign Application Priority Data
Apr. 28, 2008   (JP) ................. 2008-116621

(51) Int. Cl.
*G01L 1/00* (2006.01)
(52) U.S. Cl.
USPC .......................................................... 73/760
(58) Field of Classification Search
USPC .......................................................... 73/760
See application file for complete search history.

(56) References Cited

U.S. PATENT DOCUMENTS

| | | | |
|---|---|---|---|
| 4,106,342 A * | 8/1978 | Sormunen | 73/386 |
| 4,934,198 A | 6/1990 | Doemens | |
| 5,103,089 A * | 4/1992 | Shimura et al. | 250/231.13 |
| 5,136,159 A * | 8/1992 | Nakazawa et al. | 250/230 |

(Continued)

FOREIGN PATENT DOCUMENTS

| JP | 62-157791 U | 10/1987 |
|---|---|---|
| JP | 02-264397 A | 10/1990 |

(Continued)

OTHER PUBLICATIONS

International Search Report for PCT/JP2009/056464 mailed May 12, 2009 (4 pages).
Extended European Search Report for PCT/JP2009/056464 mailed Jul. 4, 2012 (4 pages).

*Primary Examiner* — Lisa Caputo
*Assistant Examiner* — Octavia D. Hollington
(74) *Attorney, Agent, or Firm* — Seed IP Law Group PLLC (57) ABSTRACT

Provided is a displacement amplifying device which uses Pascal's principle and is insusceptible to temperature change. A main body (1) is provided with an accommodation space (11) for accommodating a medium (2) therein. The medium (2) is provided with a fluid (21) with a positive thermal expansion coefficient and a movable body (22) with a negative thermal expansion coefficient. The movable body (22) is displaced according to the movement of the fluid (21). The medium (2) is provided with a small-area first movable surface (23) and a large-area second movable surface (24). The displacement of one of the first movable surface (23) and the second movable surface (24) is transmitted to the other via the medium (2). In the displacement amplifying device, even if the volume of the fluid (21) is changed by the temperature change of the medium (2), the amount of change of the volume of the medium (2) as a whole can be kept low by the volume change of the movable body (22).

17 Claims, 4 Drawing Sheets

(56) References Cited

U.S. PATENT DOCUMENTS

| | | | |
|---|---|---|---|
| 7,171,851 B2 * | 2/2007 | Kamata | 73/152.59 |
| 7,278,318 B2 * | 10/2007 | Dannhauer et al. | 73/716 |
| 7,377,176 B1 | 5/2008 | Broden | |
| 7,591,184 B2 * | 9/2009 | Broden | 73/718 |
| 7,805,991 B2 * | 10/2010 | Usui et al. | 73/290 V |
| 8,042,401 B2 * | 10/2011 | Broden | 73/723 |
| 2010/0025253 A1 | 2/2010 | Yoshioka et al. | |

FOREIGN PATENT DOCUMENTS

| | | |
|---|---|---|
| JP | 2008-063389 A | 3/2008 |
| JP | 2008-081812 A | 4/2008 |
| JP | 2008-111548 A | 5/2008 |
| WO | 03/102636 A1 | 12/2003 |

* cited by examiner

← Low temperature    Temperature    High temperature →

DISPLACEMENT TRANSDUCER

BACKGROUND OF THE INVENTION

1. Field of the Invention

The present invention relates to a displacement transducer. In more detail, the present invention relates to a device that can amplify or reduce displacement, using Pascal's principle.

2. Description of the Related Art

Piezoelectric elements and super magnetostrictors exist as elements capable of high-speed response in the kHz operational frequency range. These elements have a high-speed response, but there is a problem in that the range of movement (stroke) is minute, in the micrometer range.

A method for magnifying displacement up to a practically sufficient level by amplifying displacement using a mechanical "lever" has been considered when using such an element as an actuator.

However, if a high-speed operation element is combined with a mechanical displacement amplification mechanism, response speed of the system overall is commonly slowed to around 0.01 seconds due to the mechanical resonance characteristic of the amplification mechanism, which is a major restraining factor on the design.

A displacement amplification mechanism that uses Pascal's principal for fluids has therefore been proposed (refer to patent publication 1, for example). With this displacement amplification mechanism, it is possible to increase amplification factor of displacement as a proportion of surface area s of a driven portion with respect to surface area S of a driving portion (s/S) becomes smaller. However, because of the displacement amplification it is necessary for the relationship s/S<1 to hold in principle. By making s/S greater than 1, displacement attenuation is also possible.

If this type of displacement amplification mechanism is used, it becomes possible to simultaneously satisfy the need for high displacement amplification factor and high-speed response.

Patent publication 1: International Publication WO2003/102636

With a displacement amplification mechanism that uses Pascal's principle, fluid is used as a medium for transmitting displacement of the driving section to the driven section. The fluid generally has a characteristic of large volume fluctuation (expansion or contraction) with temperature change.

With a conventional displacement transducer mechanism, therefore, there is variation in the displacement of the driving surface or the driven surface attributable to volume fluctuation due to temperature change. Specifically, the conventional displacement transducer mechanism suffers from variable displacement due to temperature change, which means that there is a problem of deterioration in the accuracy of the displacement to be transmitted.

The present invention has been conceived in view of this type of situation. An object of the present invention is to utilize Pascal's principle to provide a displacement amplification device that is not susceptible to the effects of temperature variation.

SUMMARY OF THE INVENTION

The present invention has a configuration disclosed in any of the following aspects.

(Aspect 1)

A displacement transducer, having a main body and a medium, wherein the main body has a containment space for holding the medium inside, the medium is contained inside the containment space, and the medium is further comprised of a fluid having a positive coefficient of thermal expansion, and movable bodies having a negative coefficient of thermal expansion, wherein the movable bodies are constructed to displace in accordance with movement of the fluid, the medium further comprises a first movable surface and a second movable surface, the first movable surface constitutes part of a surface of the medium, the second movable surface constitutes another part of a surface of the medium, surface area of the second movable surface is larger than surface area of the first movable surface, and displacement in one of the first movable surface or the second movable surface is transmitted via the medium to the other of the first movable surface or the second movable surface.

According to the present invention, in the case where temperature of a medium is raised, for example, volume change due to the thermal expansion of the fluid can be compensated by volume change due to contraction of the movable bodies.

Also, since the movable bodies are constructed to displace in accordance with movement of fluid, it is difficult for the movable bodies to inhibit movement of the fluid. With this invention therefore, it becomes possible to transmit displacement using Pascal's principle, while preventing deterioration in displacement-transmitting capability of the medium.

With this embodiment it is possible to obtain a displacement amplification effect by driving a second movable surface having a large surface area, and extracting displacement at a first movable surface having a small surface area. Conversely, it is possible to obtain a displacement attenuation effect by driving the first movable surface having a small surface area, and extracting displacement at the second movable surface having a large surface area.

(Aspect 2)

The displacement transducer of the first aspect, wherein the movable bodies are constructed from a plurality of granular bodies having a negative coefficient of thermal expansion.

By making the movable bodies from granular bodies, it becomes possible to also give the movable bodies themselves high liquidity. As a result, with this invention, even if the overall volume of the movable bodies (total volume) is large, it is possible to keep reduction in the displacement-transmitting capability of the medium low. As a result, with this invention it becomes possible to increase a volume ratio of the movable bodies with respect to the fluid body, and it is possible to expand the temperature range within which volume compensation is possible. The term granular body here is intended to include the meaning of powder.

(Aspect 3)

The displacement transducer of aspect 1 or aspect 2, further comprising a first movable film and a second movable film, the first movable film being arranged adjacent to the first movable surface, and the second movable film being arranged adjacent to the second movable surface.

It is possible to input displacement using one of the first movable film and the second movable film, and extract displacement externally using the other of the first movable film and the second movable film. Accordingly, these films are preferably capable of being displaced completely or partially relative to the main body. It is also possible to expect a sealing effect of the medium by providing these films. Further, these films do not need to be in direct contact with the medium, and can be adjacent via some sort of intermediate. However, use of these movable films is not essential. For example, it is also possible to bring a piston of a displacement input/output mechanism that uses a piston and a cylinder into direct contact with the movable surface.

(Aspect 4)

The displacement transducer of any one of aspect 1 to aspect 3, wherein the fluid is composed of a liquid having a positive coefficient of thermal expansion.

A liquid generally has high liquidity, which makes it suitable as a medium of the displacement transducer device of the present invention. Also, a liquid has an intermolecular distance that is longer than in a solid, which means it generally has a positive coefficient of thermal expansion. However, the medium of the present invention is not limited to a fluid, and is not particularly restricted as long as it has the liquidity required to implement the present invention. For example, the use of a sol type material, or a gel type material providing it has high liquidity.

(Aspect 5)

The displacement transducer of any one of aspect 1 to aspect 4, further comprising a volume compensation section, wherein the volume compensation section is made from a material having a negative coefficient of thermal expansion, and the volume compensation section is arranged adjacent to the medium.

By providing the volume compensation section separately, it becomes possible to increase the temperature range in which volume compensation is possible. The volume compensation section can also contact the medium, and can also indirectly contact the medium via some sort of material. The volume compensation section can be placed adjacent to the medium so that it is possible to transmit displacement of the volume compensation section.

(Aspect 6)

The displacement transducer of any one of aspect 1 to aspect 5, further comprising an input mechanism and an output mechanism, wherein the input mechanism is configured to apply displacement to one of the first movable surface or the second movable surface, and the output mechanism is configured to extract displacement of the other of the first movable surface or the second movable surface externally.

(Aspect 7)

A displacement transducer method that uses the displacement transducer of any one of aspect 1 to aspect 6, comprising a step of applying displacement to one of the first movable surface or the second movable surface, and a step of extracting displacement of the other of the first movable surface or the second movable surface externally.

According to the present invention, it is possible to provide a displacement amplification device that utilizes Pascal's principle, and that is not susceptible to the effects of temperature variation.

DESCRIPTION OF PREFERRED EMBODIMENTS

First Embodiment

A displacement amplification device of a first embodiment of the present invention will be described in the following based on FIG. 1 to FIG. 3.

A displacement amplification device of this embodiment comprises a main body 1, a medium 2, a first movable film 3, a second movable film 4, an input mechanism 5 and an output mechanism 6 as basic structural elements.

Figure 1:
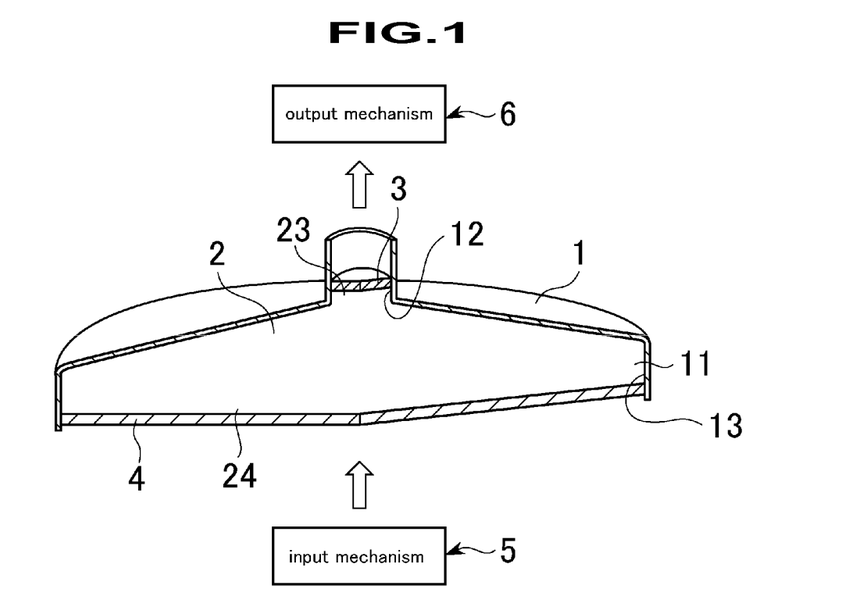
FIG. 1 is an explanatory drawing for describing a displacement transducer of a first embodiment of the present invention, and shows a cross section of part of a main body.
Figure 2:
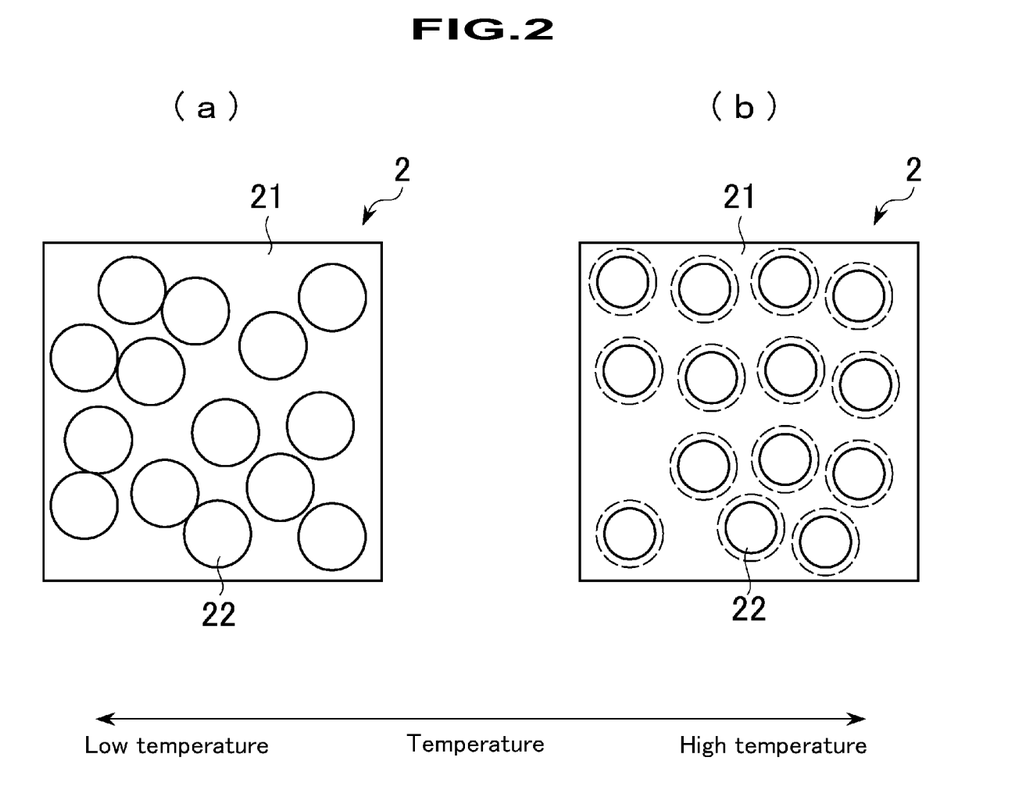
FIG. 2(a) is an explanatory drawings showing part of a medium shown in FIG. 1 in an expanded state.
FIG. 2(b) is an explanatory drawing for describing movable bodies in FIG. 2(a) in a contracted state.

The main body 1 is formed having a flat cylindrical shape overall (refer to FIG. 1). A containment space 11 is formed inside the main body 1.

The containment space 11 comprises a small area section 12 and a large area section 13. The small area section 12 is formed by reducing the diameter of the main body 1 at one end (at the upper end in FIG. 1). The large area section 13 is formed at the other end of the main body 1 (at the lower end in FIG. 1). The large area section 13 has a cross sectional area (cross section area of the main body 1) that is larger than that of the small area section 12.

The medium 2 is contained inside the containment space 11. Also, the medium 2 comprises a fluid 21 having a positive coefficient of thermal expansion, and movable bodies 22 having a negative coefficient of thermal expansion (refer to FIG. 2(a)).

In this embodiment a liquid is used as the fluid 21. As a more specific example, it is possible to use various liquids such as pure water or a silicone oil exemplified by Polydimethylsiloxane (PDMS). However, the fluid is not limited to a liquid, and it is possible to use any material that has sufficient fluidity for actual use, such as a so-called sol type material or gel type material.

The movable bodies 22 are constructed to displace in accordance with movement of the fluid 21. In this embodiment, a plurality of microscopic spheres formed from zirconium tungstate ($ZrW_2O_8$) are used as the movable bodies 22. However the material that can be used for the movable bodies 22 is not limited to zirconium tungstate, and it is possible to use, for example, a silicon oxide ($Li_2O-Al_2O_3-nSiO_2$).

The shape of the movable bodies 22 is also not limited to being absolutely spherical, and can be made various shapes, with a powder state being possible. Alternatively, depending on the material used, it can also be considered possible for the movable bodies 22 to be of sol type or gel type. The size of the movable bodies 22 is preferably of a smallness to flow easily into the inside of the small area section 12 (that is, sufficiently smaller than a first movable surface 23). If this type of structure is adopted, it is possible to improve the liquidity of the medium 2.

Basically, it is possible to use a material that has a negative coefficient of thermal expansion and that does not excessively restrict movement of the fluid 21 as the movable body 22.

The medium 2 is also provided with a first movable surface 23 and a second movable surface 24.

The first movable surface 23 constitutes part of a surface of the medium 2. Also, the first movable surface 23 is arranged inside the small area section 12 of the containment space 11.

The second movable surface 24 constitutes another part of the surface of the medium 2. Also, the second movable surface 24 is arranged inside the large area section 13. In this way, the second movable surface 24 has a larger surface area than the first movable surface 23.

The device of this embodiment is configured to transmit displacement of one of the first movable surface 23 or the second movable surface 24 to the other via the medium 2. That is, with this structure, a displacement transducer mechanism based on Pascal's principle is realized.

The first movable film 3 is arranged contacting the first movable surface 23 that is arranged in the small area section 12. Also, the second movable film 4 is arranged contacting the second movable surface 4.

With this embodiment the input mechanism 5 is configured to input displacement with respect to the second movable film 4. As the input mechanism 5 it is possible to use an appropriate displacement input mechanism, such as, for example, a piston and cylinder mechanism for driving a cylinder using fluid pressure, a ball screw mechanism for converting rotation to displacement, or a suitable link mechanism.

With this embodiment, the output mechanism 6 is configured to extract displacement of the first movable film 3. As the output mechanism 6 it is possible to use mechanically similar means to that of the input mechanism 5 in order to extract displacement. Obviously it is also possible to use a different mechanism to that of the input mechanism 5 as the output mechanism 6, as long as the mechanism is basically capable of extracting displacement as an output.

Operation of Displacement Transducer Mechanism of the First Embodiment

Next, operation of the displacement transducer mechanism of this embodiment will be described mainly with reference to FIG. 2 and FIG. 3.

Operation of the basic displacement amplification operation will first be described. The second movable film 4 is displaced using the input mechanism 5 (refer to FIG. 3). If this happens the second movable surface 24 of the medium 2 is displaced, and the displacement is conveyed to the first movable surface 23 through the medium 2 itself. With this embodiment, the area of the second movable surface 24 is larger than the area of the first movable surface 23. Displacement of the first movable surface 23 is therefore amplified compared to the displacement of the second movable surface 24. This relationship can be expressed as follows:

$$X1 = \alpha \cdot X2$$

Here,
X1 is displacement of the first movable surface
X2 is displacement of the second movable surface
$\alpha$ is amplification factor The amplification factor $\alpha$ is generally determined using a ratio of the area s of the first movable surface 23 to the area S of the second movable surface (s/S). If, as in this embodiment, s<S, the amplification factor $\alpha$ becomes 1<$\alpha$. Naturally, if the system is designed such that S<s, the amplification factor $\alpha$ becomes $\alpha$<1. In this case, the displacement will be transmitted in an attenuated form.

Next, operation in the case where the temperature of the medium 2 has been raised will be described. In the device of this embodiment, when the temperature of the medium 2 is raised, the fluid 21 undergoes thermal expansion and the volume increases. As a result, in the case where only the fluid 21 is used as the medium 2 displacement of the fluid level arises due to the temperature change, and accuracy of the displacement to be transmitted is deteriorated.

On the other hand, with the device of this embodiment the movable bodies 22 having a negative coefficient of thermal expansion are used as the medium 2 in addition to the fluid 21, which means that if the temperature of the medium 2 rises the volume of the movable bodies 22 is reduced (refer to FIG. 2(b)).

In this way, with this embodiment it is possible to compensate volume increase of the fluid 21 with volume reduction due to contraction of the movable bodies 22. Specifically, with this device there is the advantage that it is possible to keep down the amount of volume fluctuation accompanying rise in temperature.

Similarly, if the temperature of the medium 2 is lowered, it is possible to reduce the amount of volume fluctuation using the opposite action to that just described.

Accordingly, with the device of this embodiment it is possible to keep volume fluctuation accompanying temperature change small, and as a result there is the advantage that it is possible to improve accuracy of the displacement to be transmitted.

Also, with this embodiment, since the movable bodies 22 are configured to displace in accordance with movement of the fluid 21, it is unlikely that the movable bodies 22 will inhibit movement of the fluid 21. With this embodiment, therefore, there is the advantage that it becomes possible to transmit displacement using Pascal's principle, while preventing deterioration in displacement-transmitting capability of the medium 2.

Also, since the movable bodies 22 of this embodiment are made from a plurality of granular bodies, the movable bodies 22 themselves are provided with high liquidity. It is therefore possible to keep down any reduction in the displacement transmission capability by the medium 2, even if the volume (total volume) of the movable bodies 22 overall is made large. As a result, with the device of this embodiment it becomes possible to increase a volume ratio of the movable bodies 22 with respect to the fluid body 21, and as a result there is the advantage that it is possible to expand the temperature range within which volume compensation is possible.

With this embodiment, since the movable bodies 22 are mixed in the fluid 21, it is also possible to impart high liquidity to the medium 2 compared to using only the movable bodies 22 as the medium. As a result, with this device there is the advantage that it is possible to smoothly displace or deform the medium 2.

Figure 3:
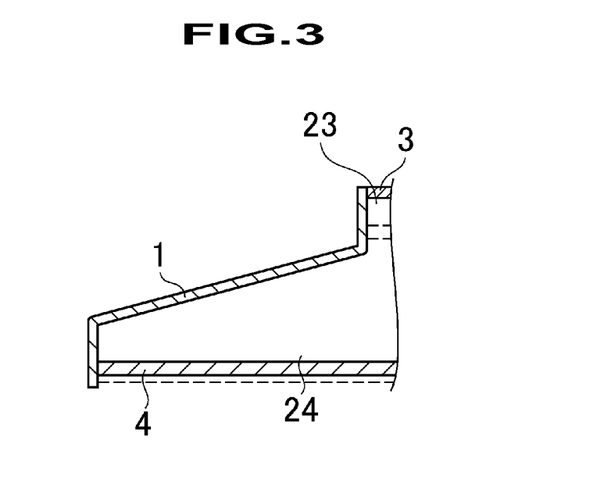
FIG. 3 is an explanatory drawing for describing displacement of a first movable film and a second movable film shown in FIG. 1.
Figure 4:
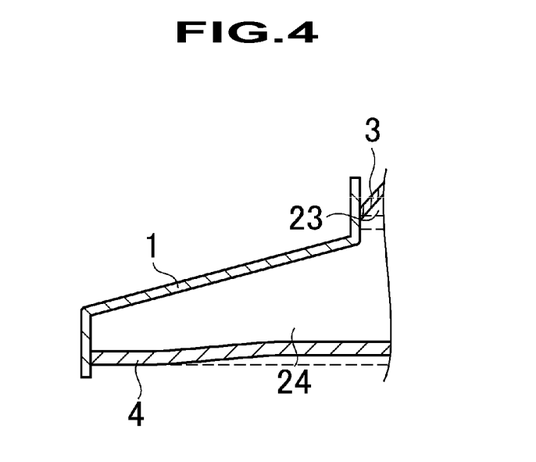
FIG. 4 is an explanatory drawing for describing a modified example of the displacement transducer of the first embodiment.

In the description above, the whole of each of the first movable film 3 and the second movable film 4 is moved with respect to the main body 1 (refer to FIG. 3). However, as shown in FIG. 4, it is also possible to have a structure in which only a part (for example a central part) of both or one of the first movable film 3 and the second movable film 4 is moved. In this case, the first movable film 3 and the second movable film 4 are preferably constructed using a flexible film capable of deformation.

Second Embodiment

Figure 5:
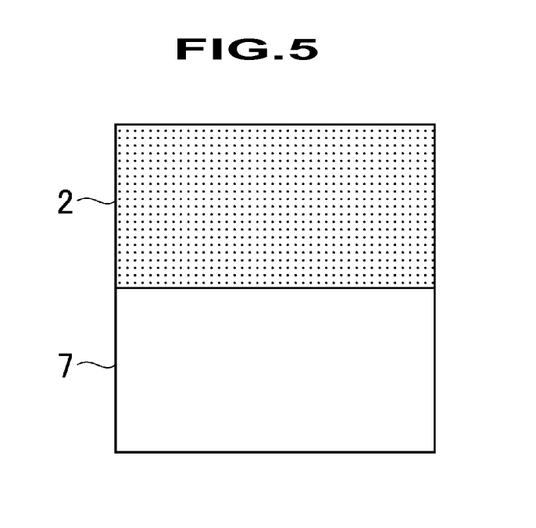
FIG. 5 is an explanatory drawing for describing a displacement transducer of a second embodiment of the present invention.

Next a displacement transducer of a second embodiment of the present invention will be described based on FIG. 5. In the description of this second embodiment, elements that are basically common to the device of the first embodiment described are assigned the same reference numerals, and description is simplified.

The device of the second embodiment is further provided with a volume compensation section 7. The volume compensation section 7 is made from a material having a negative coefficient of thermal expansion. With this embodiment, the volume compensation section 7 is formed using zirconium tungstate crystal. However, similarly to the case of the movable bodies 22, it is possible to adopt various materials as the volume compensation section 7 as long as it is a material having a negative coefficient of thermal expansion.

The volume compensation section 7 is arranged at a position contacting the medium 2. For example, the volume compensation section 7 is fixed to an inner surface (surface facing the containment space 11) of the main body 1. However the position of the volume compensation section 7 can be anywhere as long as it is a position facing the medium 2. For example, it is possible to suspend the volume compensation section 7 inside the medium 2, or to arrange the volume compensation section 7 inside the medium in a non-fixed state. It is also possible to provide an opening in a side surface of the main body 1, and to bring the volume compensation section 7 into contact with the medium 2 through this opening.

It is also possible for some type of intermediary substance to exist between the volume compensation section 7 and the medium 2. For example, it is possible to have a film for preventing outflow of the medium 2 between the volume compensation section 7 and the medium 2. Essentially, the volume compensation section 7 can be placed adjacent to the medium 2 in a state where it is possible to transmit displacement of the volume compensation section 7 itself to the medium 2.

With the device of the second embodiment, since the volume compensation section is provided separately, it becomes possible to increase the temperature range in which volume compensation is possible. Specifically, with this embodiment, not only the movable bodies 22 but also the volume compensation section 7 is displaced in response to temperature change, and so by using this displacement it becomes possible to compensate displacement of the fluid 21 due to temperature change.

The remaining structure and advantages of the second embodiment are the same as for the first embodiment described above, and so description of any further detail is omitted.

Third Embodiment

Figure 6:
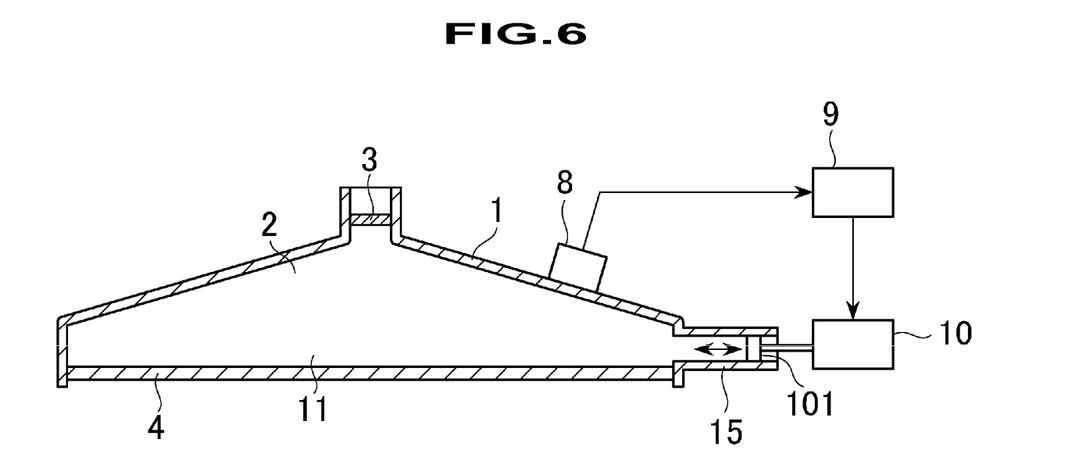
FIG. 6 is an explanatory drawing for describing a displacement transducer of a third embodiment of the present invention.

Next a displacement transducer of a third embodiment of the present invention will be described based on FIG. 6. In the description of this third embodiment, elements that are basically common to the device of the first embodiment described are assigned the same reference numerals, and description is simplified.

The device of the third embodiment further comprises a sensor 8, a controller 9 and a drive section 10. The main body 1 of this embodiment is further provided with a cylinder section 15.

The sensor 8 is fitted to an outer surface of the main body 1 in this embodiment. The sensor 8 can measure the temperature of the medium 2 contained inside the containment space 11. The place where the sensor 8 is attached can be an appropriate position, such as inside the main body 1. Essentially, the sensor 8 needs to be configured capable of measuring the temperature of the medium 2.

The controller 9 is provided with the capability of transmitting control signals to the drive section 10 in accordance with output from the sensor 8. The controller 9 can be constituted by, for example, a personal computer and appropriate computer software (not shown).

The drive section 10 is provided with a piston 101. The drive section 10 causes forward and backward motion of the piston 101 with respect to the cylinder section 15, in accordance with commands from the controller 9.

The cylinder section 15 of the main body 1 is formed in a hollow cylindrical shape. One end (left end in FIG. 6) of the cylinder section 15 is in communication with the containment space 11 formed inside the main body 1. In this way, the medium 2 is filled into the inside of the cylinder section 15 (to be more precise, the region up to the piston 101).

With the device of the third embodiment, the controller 9 moves the piston 101 of the drive section 10 in response to temperature of the medium 2 that has been measured by the sensor 8. For example, if the temperature rises, the piston 101 is retracted, while if the temperature falls the piston 101 is advanced. In this way it is possible to compensate volume fluctuation of the medium 2 accompanying temperature change.

Accordingly, with the device of this embodiment it is possible to keep deterioration in the accuracy of the displacement to be transmitted by this device low, even in the event that there is temperature variation exceeding that which can be compensated by the movable bodies 22.

The remaining structure and advantages of the third embodiment are the same as for the first embodiment described above, and so description of any further detail is omitted.

Modified Example

Figure 7:
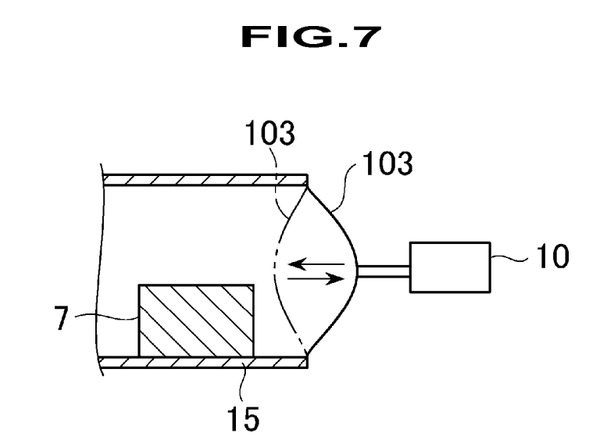
FIG. 7 is an explanatory drawing for describing a modified example of the third embodiment, and shows a cylinder section of FIG. 6 in an expanded state.

With the third embodiment described above, the piston 101 was provided in the drive section 10, and this piston 101 was moved forwards or backwards with respect to the cylinder section 15 of the main body 1. However, instead of this structure, it is also possible to have a structure in which a rim of an elastic film 103 is fixed to an end section of the cylinder section 15, and the proximity of the center of the elastic film 103 is moved forward and backward by the drive section 10 (refer to FIG. 7). FIG. 7 shows expansion of only the vicinity of a section corresponding to the cylinder section 15 of FIG. 6.

It is also possible to contain the volume compensation section 7 that was described in the second embodiment inside the cylinder section 15 (refer to FIG. 7).

Working Example

A working example using the structure shown in the first embodiment will be described in the following. The following structure is adopted in this working example.

fluid 21: pure water (volume expansion coefficient of $7.7 \times 10^{-5}$ at 9° C.)

movable bodies 22: numerous microscopic spheres formed from zirconium tungstate (volume expansion coefficient of $-2.7 \times 10^{-5}$ at 9° C.)

The microscopic spheres of zirconium tungstate used as the movable bodies 22 adopt a hexagonal closed-packing structure in the pure water. Also, the values of any of the previously described volume expansion coefficients are values calculated by interpolation (speculative values), and are not measured values.

If the volume expansion coefficients of pure water and zirconium tungstate are assumed to be the above described values, then in the case where the microscopic spheres adopt a hexagonal closed-packing structure (filling rate of about 74%), then it is only possible absolutely prevent volume change at 9° C. With this practical example, by selecting a volume ratio of the liquid and the microscopic spheres, it considered that it will be possible to almost completely prevent volume fluctuation in the range from about 4° C. to about 9° C. The volume ratio of the liquid and the microscopic spheres is preferably changed depending on the temperature at which it is desired to have no volume fluctuation.

Also, in the case of a temperature above that described, it is possible, for example, to use the volume compensation section 7 shown in the second embodiment. For example, volume of the medium 2 is made $V_0$, and volume of the volume compensation section 7 is made $V_+$. When the temperature of the medium 2 is 20° C., if $V_+=1.3 \cdot V_0$, volume fluctuation can be canceled by the medium 2 and the volume compensation section 7 working together as one. Accordingly, it is possible to prevent fluctuation of the first movable surface 23 and the second movable surface 24 due to temperature variation.

The descriptions of the above-described embodiments and practical example are merely examples, and do not show the essential structure of the present invention. The structure of each part is not limited to the above description as long as it falls within the scope of the invention.

What is claimed is:

1. A displacement transducer device, having a main body, a medium and a volume compensation section, wherein
    the main body has a containment space for holding the medium inside;
    the medium is contained inside the containment space, and the medium is further comprised of a fluid having a positive coefficient of thermal expansion and movable bodies having a negative coefficient of thermal expansion, wherein
    the movable bodies are constructed to displace in accordance with movement of the fluid;
    the medium further comprises a first movable surface and a second movable surface;
    the first movable surface constitutes part of a surface of the medium;
    the second movable surface constitutes another part of a surface of the medium;
    surface area of the second movable surface is larger than surface area of the first movable surface;
    displacement in one of the first movable surface or the second movable surface is transmitted via the medium to the other of the first movable surface or the second movable surface;
    the volume compensation section is made from a material having a negative coefficient of thermal expansion;
    the volume compensation section is arranged adjacent to the medium;
    and wherein the volume compensation section has a block shape having larger volume than the movable bodies.

2. The displacement transducer device of the claim 1, wherein the movable bodies are constructed from a plurality of granular bodies having a negative coefficient of thermal expansion.

3. The displacement transducer device of claim 1, further comprising a first movable film and a second movable film,
    the first movable film being arranged adjacent to the first movable surface, and
    the second movable film being arranged adjacent to the second movable surface.

4. The displacement transducer device of claim 1, wherein the fluid is composed of a fluid having a positive coefficient of thermal expansion.

5. The displacement transducer device of claim 1, further comprising an input mechanism and an output mechanism, wherein
    the input mechanism is configured to apply displacement to one of the first movable surface or the second movable surface, and
    the output mechanism is configured to extract displacement of the other of the first movable surface or the second movable surface externally.

6. A displacement transducer method that uses the displacement transducer device of claim 1, comprising:
    a step of applying displacement to one of the first movable surface or the second movable surface; and
    a step of extracting displacement of the other of the first movable surface or the second movable surface externally.

7. The displacement transducer device of claim 1, wherein the volume compensation section is arranged at a position contacting the medium.

8. The displacement transducer device of claim 1, wherein the volume compensation section is fixed to an inner surface of the main body so that the volume compensation section faces the containment space.

9. The displacement transducer device of claim 1, wherein the volume compensation section is suspended inside the medium.

10. The displacement transducer device of claim 1, wherein the volume compensation section is arranged inside the medium in a non-fixed state.

11. The displacement transducer device of claim 1, wherein an opening is provided in a side surface in the main body, and the volume compensation section is in contact with the medium through the opening.

12. The displacement transducer device of claim 1, further comprising a film for preventing outflow of the medium, between the volume compensation section and the medium.

13. The displacement transducer device of claim 1, further comprising a sensor, a controller and a drive section,
    wherein the sensor is constructed to measure temperature of the medium,
    the controller is constructed to transmit control signals in accordance with output from the sensor, and
    the drive section is constructed to control quantity of the medium in the containment space in accordance with the control signal from the controller.

14. The displacement transducer device of claim 13, wherein the main body further comprises a cylinder section which is in communication with the containment space,
    the drive section comprises a piston which is capable to move forward and backward within the cylinder section so that the drive section controls the quantity of the medium in the containment space in accordance with the control signal from the controller.

15. The displacement transducer device of claim 13, wherein the volume compensation section is disposed within the cylinder section.

16. The displacement transducer device of claim 13, wherein the main body further comprises a cylinder section which is in communication with the containment space,
    the cylinder section comprises an elastic film which is fixed to an end opening section of the cylinder section,
    the drive section is constructed to move the elastic film so that the drive section controls the quantity of the medium in the containment space in accordance with the control signal from the controller.

17. The displacement transducer device of claim 1, wherein the presence of the volume compensation section increases a temperature range over which a volume compensation can be implemented.

* * * * *

UNITED STATES PATENT AND TRADEMARK OFFICE
CERTIFICATE OF CORRECTION

| | | |
|---|---|---|
| PATENT NO. | : 8,511,173 B2 | Page 1 of 1 |
| APPLICATION NO. | : 12/990188 | |
| DATED | : August 20, 2013 | |
| INVENTOR(S) | : Hiromasa Oku et al. | |

It is certified that error appears in the above-identified patent and that said Letters Patent is hereby corrected as shown below:

In the Claims

Column 10, Line 51:
"15. The displacement transducer device of claim 13," should read, --15. The displacement transducer device of claim 14,--.

Signed and Sealed this
Nineteenth Day of November, 2013

Teresa Stanek Rea
*Deputy Director of the United States Patent and Trademark Office*